June 26, 1962  G. A. WORN  3,041,150
APPARATUS FOR EFFECTING CATALYTIC EXOTHERMIC REACTIONS
Filed Feb. 20, 1956
Fig. 1.
Fig. 2.
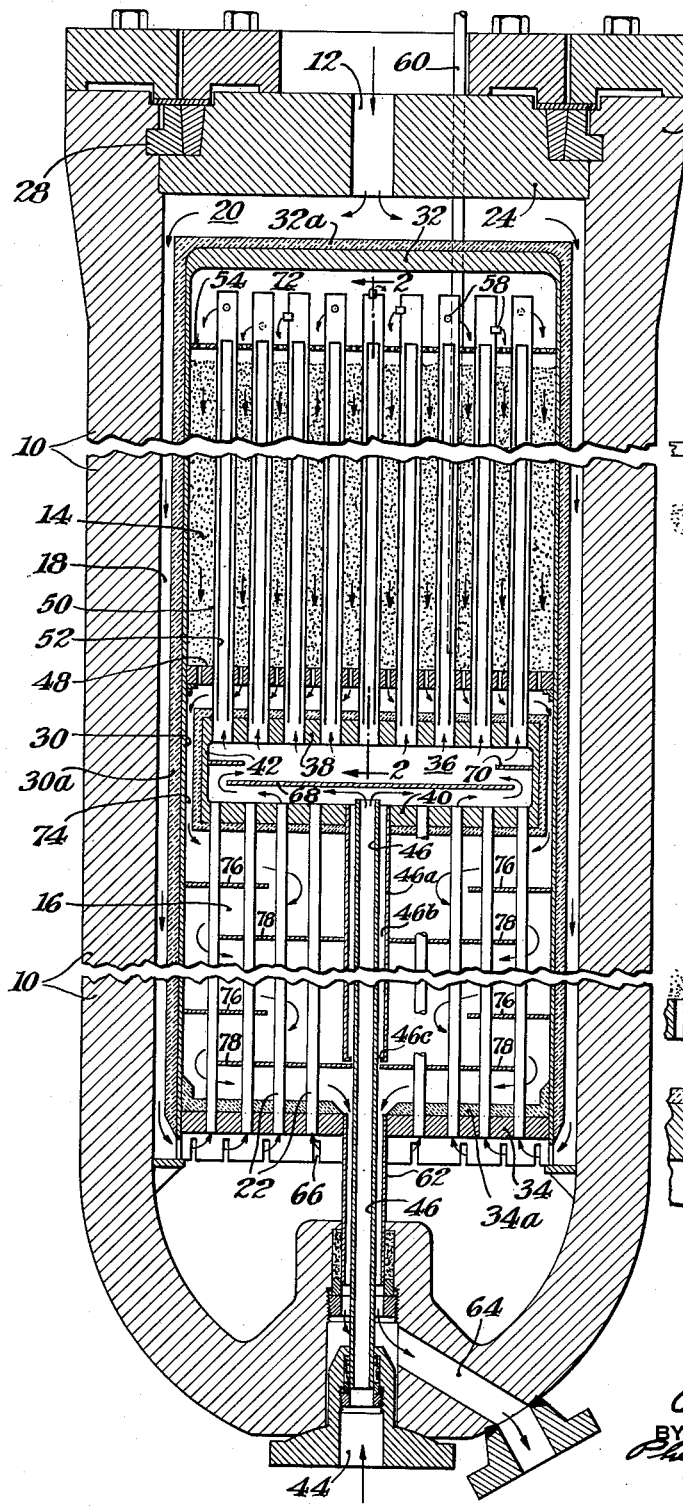
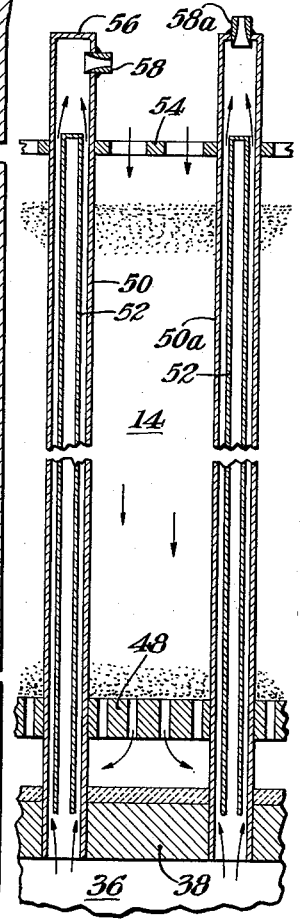
INVENTOR
GEORGE A. WORN
BY
Philip D. Junkins
AGENT 3,041,150
APPARATUS FOR EFFECTING CATALYTIC
EXOTHERMIC REACTIONS
George A. Worn, La Jolla, Calif., assignor to The Lummus Company, New York, N.Y., a corporation of Delaware
Filed Feb. 20, 1956, Ser. No. 566,578
1 Claim. (Cl. 23—289)

This invention relates to apparatus for carrying out high temperature exothermic gas reactions and more particularly refers to improvements in apparatus for the synthetic production of ammonia and chemical reactions of like character.

In the synthesis of ammonia the combined nitrogen and hydrogen gases are compressed to an elevated pressure, heated to a suitable temperature ranging from 400° to 600° C. and passed over a suitable catalytic agent whereby a certain proportion of the combined gases is converted into ammonia. The pressure of the nitrogen-hydrogen gases in contact with the catalyst is constant or as nearly so as possible.

In commercial operations many difficulties are encountered in maintaining the catalyst at an optimum temperature after being initially heated from within and variations of such temperature in either direction lowers the conversion efficiency of the catalyst with decreased yields. It has been found that too low temperatures greatly decrease the activity of the catalyst, so that cooling takes place below that required to maintain the reaction, and therefore production of ammonia ceases entirely.

Furthermore, it has been found that the portion of catalyst which first comes in contact with the gas mixture where the activity is more intense may become injured by overheating or even poisoned by impurities in the gases. Even though such heat may be removed by suitable cooling surfaces surrounding that portion of the catalyst, yet local overheating is likely to occur in the form of hot spots in the catalyst mass.

Heretofore removal of the heat of reaction has been accomplished throughout the catalyst by the use of heat transfer surfaces suitably disposed within the catalyst mass, but such system of control inevitably permits great difference in temperature in various parts of the catalyst mass and allows no adequate control of temperature capable of being varied with operating conditions to secure optimum temperatures for maximum conversion.

It is an object of my invention to provide for better control of the temperatures developed during exothermic catalytic reactions whereby the heat evolved in the catalyst mass is prevented from substantial variation.

A further object of my invention is to provide an improved catalytic reactor for carrying out high temperature exothermic reactions wherein substantial construction economies can be realized as well as ease of maintenance and repair.

Other objects of my invention will be apparent from the accompanying drawing and the following description of the features of the invention and in the provision of apparatus and methods of operation for accomplishing the foregoing objects.

In the drawing:

FIGURE 1 represents a vertical section of a converter adapted for carrying out my invention; and FIGURE 2 represents an enlarged partial view of the catalyst bed of the converter of FIGURE 1.

The converter comprises an outer shell 10, provided with a main gas inlet 12, the shell enclosing a catalyst bed 14, and a preheating zone 16, both spaced from the outer shell by an annular passageway 18 extending from a gas receiving chamber 20 at the top of the converter to the lower portion of said preheating zone. The preheating zone is equipped with heat exchange tubes 22. The shell 10 is provided with a closure 24 at the top to provide access to the catalyst bed and associated apparatus and, as illustrated, the entire internal structure of the converter may be removed upwardly through open end 26 of the shell for inspection and maintenance purposes. During process operation the closure 24 is locked into sealed relation with the shell. As illustrated in the drawing, the sealed relation may be accomplished by shear ring 28 and associated retaining rings and gaskets as disclosed in Gertzon Patent 2,268,507, however, any form of sealing arrangement for making a fluid tight high pressure joint between the cover and shell may be used.

The catalyst bed 14 and preheating zone are contained within a cylindrical shell 30 set within the converter vessel and having an integral top 32 and a bottom 34 strong enough to withstand pressures employed during process operation. Surrounding the inner shell 30 and top 32 is an insulating refractory 30a and 32a which aids in maintaining the shell 10 relatively cool, thereby avoiding gas penetration by the gases and retarding of the reaction of hydrogen or similar active gas. The bottom plate 34 carries a similar insulating refractory 34a on its inner side. The bottom plate 34 forms a tube sheet for tubes 22 and is of substantial thickness whereby such tubes may be adequately affixed thereto. A chamber or header 36 formed by tube sheets 38 and 40 and annular wall 42 is located above preheating zone 16 and forms a manifold area wherein regulated quantities of controlled temperature by-pass gas entering through inlet 44 and pipe 46 can mix with preheated reactant gas to control the temperature of such gases just prior to their passage through the catalyst bed. The tube sheets and annular wall forming chamber 36 are insulated with a refractory on their outer surface. Surrounding pipe 46 is a tube 46a which extends from a point near the inner face of tube sheet 34 to tube sheet 40 and forms an annular clearance space 46b which is substantially sealed from communication with zone 16 by annular flange 46c but which permits the free withdrawal of pipe 46 from within the preheating zone 16.

Above tube sheet 38 is a perforated plate 48 which support catalyst bed 14. The catalyst of the bed 14 is packed around a plurality of pipes 50, each of which surrounds a tube 52. Each pipe 50 passes through plate 48 and is affixed to tube sheet 38 at its lower end. The upper portion of pipes 50 extend through a grid 54 which may act as a mixing baffle across the top of the catalyst bed. The upper end of pipes 50, other than central pipe 50a, are sealed by plate 56. Each of these pipes has an exit orifice 58 which increases the velocity of gases flowing within such pipes and directs such gases across the top of the catalyst bed in various directions for mixing. These orifices not only direct gases in a multitude of directions but are positioned at several levels above the catalyst bed to further aid in thoroughly mixing gases to react. Central pipe 50a has an orifice 58a which is positioned to direct gases upwardly for deflection against top 32.

The tubes 52 within pipes 50 are closed at their upper end and act as core rods in order to give the maximum rate of heat transfer from reaction products to the gases to be reacted. The tubes 52 are maintained in spaced relation within the pipes 50 by spacers (not shown). Tubes 22 may likewise be provided with core rods to aid in promoting maximum heat transfer from reaction products to gases to be reacted. A plurality of pipes 60 may extend through closure 24, the top 32 of shell 30 and into the catalyst bed at several points and contain thermocouples for detecting hot spots which may develop in the bed. Control means (not shown) responds to the temperature condition of the catalyst bed as detected by the thermocouples and regulates the main flow of cold reactant gases and temperature controlling gases through the bypass inlet 44. Pipe 62 which, as shown, may surround pipe 46 provides an outlet for the cooled products of reaction. Product gases leaving the preheating zone 16 through pipe 62 leave the reactor through outlet 64.

In operation, the cold gases to be reacted, entering through main inlet 12 under positive pressure, pass into chamber 20 at the top of the converter and thence pass through annular space 18 between outer shell 10 and inner shell 30, and the slots 66 at the bottom of shell 30 to the lower end of tubes 22. The cold gases pass upwardly through tubes 22 which are surrounded by hot reaction gases passing downwardly in serpentine flow through zone 16. The entering gases to be reacted are heated and the exit gases simultaneously cooled. Preheated gases issuing from the upper end of tubes 22 are redirected by baffles 68 and 70, whereby they are mixed with the temperature controlled by-pass gases entering from pipe 46 prior to passage upwardly through the pipes 50 within the interior of the catalyst bed 14. Thus, the partially preheated entering gases to be reacted are brought into heat exchanging relation with the catalyst, but are out of contact with the catalyst. The gases leaving the top of pipes 50 through orifices 58 are thoroughly mixed and distributed throughout space 72 above the catalyst bed 14 and then pass downwardly through grid 54 into actual contact with catalyst and there react exothermically, part of the heat of reaction being absorbed by countercurrent indirect heat exchange with the gases in pipes 50. Reacted gases leaving the lower portion of the catalyst bed pass through perforated plate 48 and across tube sheet 38 to the annular space 74 formed by shell 30 and annular wall 42 and thence pass between tubes 22 in the preheating zone as directed by baffles 76 and 78. Reactant gases, cooled by indirect heat exchange with gases in tubes 22, leave preheating zone 16 and the reactor shell 10 through the outlet pipe 62 and outlet 64.

During the progression of the gases to be reacted, as they pass through the preheating zone and pipes 50, the temperature of such gases is progressively raised so that as they emerge from pipes 50 through orifices 58 and are mixed in chamber 72 at the top of the catalyst bed, they are at about the lower limit of the reaction temperature range. Upon contact with the catalyst, reaction takes place immediately and with considerable evolution of heat.

In cooling the catalyst bed 14, gases flowing in pipes 50 may become overheated and according to my invention supplementary additional cold or partially heated gases to be reacted are introduced through inlet 44 and pipe 46 to manifold arer 36 and therein mix with and cool the gases from tubes 22 for passage to the top of the catalyst bed. By appropriate control of the supplementary cold gases the temperature most favorable for efficient reaction is maintained and damage to the catalyst by overheating as well as lower efficiency of conversion is avoided. Additional temperature regulation is afforded by a heater (not shown) located in the gas supply line (not shown) for inlet 44 to supply higher temperatures required for initial starting of the reaction. This heater may be operated in response to the aforementioned temperature indicating means.

Extremely flexible temperature regulation is afforded by the gas issuing from tube 46, permitting immediate variation with varying operating conditions as this supplemental gas may be introduced at any desired temperature, and a change may be made at any desired moment by manual control or by control responsive to thermocouples. Thus, a desired temperature control can be effected immediately without the addition of added sets of cooling tubes positioned in the catalyst bed.

By introducing temperature controlled cold "quenching" gases into manifold 36, such gases become thoroughly mixed with the preheated gases issuing from tubes 22 before reaching the top of the catalyst bed. Harmful local undercooling or channeling of gases at differing temperatures is avoided in the catalyst bed by the provision of orifices 58 which direct the gases issuing from pipes 50 in a plurality of directions and at differing levels, thereby mixing the gases to be reacted just prior to their passage through the catalyst bed.

The present arrangement of gas flow are provision for admission of supplemental gases not only provides improved control of the reaction in such converters, but also permits extensive saving in materials and construction economies such as by eliminating tubes formerly necessary in the catalyst bed to cool such bed and the elimination of several additional heavy tube sheets as required in previous converter designs.

While I have shown and described a preferred form of embodiment of my invention, I am aware that modifications may be made thereto and I therefore, desire broad interpretation of my invention within the scope and spirit of the description herein and of the claim appended hereinafter.

I claim:

Apparatus for effecting catalytic exothermic gaseous reactions which comprises: an outer shell; an inner shell mounted within said outer shell and spaced from the wall thereof so as to leave an annular space therebetween; a shell and tube type heat exchanger mounted in the bottom of said inner shell, the lower end of the tubes of said exchanger being in gas receiving communication with said annular space; a receptacle containing a catalyst bed mounted within said inner shell and positioned above said heat exchanger; inlet means in said outer shell for feeding a first portion of cold gases to be reacted into said annular space and thence through the tubes of said exchanger; a reactant header mounted within said inner shell between said heat exchanger and said catalyst receptacle and spaced from the wall of said inner shell so as to leave an annular passage therebetween, said annular passage being in gas receiving communication with said catalyst bed and in gas delivery communication with the shell side of said heat exchanger, and said header being in gas receiving communication with the upper end of the tubes of said exchanger for receiving said heated first portion of gases therefrom; inlet means for feeding a second portion of cold gases to be reacted to said header for mixing with said heated first portion of gases to be reacted; a plurality of heat exchange tubes extending through said catalyst bed, said tubes being in gas receiving communication at their lower end with said header for receiving and passing said mixed gases upwardly through said tubes in indirect heat exchange with said bed to the top of said bed for reaction therein during subsequent passage downwardly therethrough; and outlet means in gas receiving communication with the shell side of said heat exchanger for withdrawing reacted gases leaving said catalyst bed and passing through the annular passage between said header and said inner shell and thence in indirect heat exchange relationship with said first portion of gases to be reacted.

References Cited in the file of this patent

UNITED STATES PATENTS

| 1,704,214 | Richardson | Mar. 5, 1929 |
| 1,707,417 | Richardson | Apr. 2, 1929 |
| 1,909,378 | Richardson | May 16, 1933 |
| 1,932,247 | Knishern | Oct. 24, 1933 |
| 1,980,718 | Edmonds | Nov. 13, 1934 |
| 2,051,774 | Kleinschmidt | Aug. 18, 1936 |
| 2,319,508 | Leprestre | May 18, 1943 |
| 2,330,767 | Welty | Sept. 28, 1943 |

FOREIGN PATENTS

| 740,154 | France | Nov. 12, 1932 |